(12) United States Patent
Lutnick et al.

(10) Patent No.: US 7,729,967 B2
(45) Date of Patent: Jun. 1, 2010

(54) SYSTEMS AND METHODS FOR PROVIDING AN ONLY AT BEST ORDER TYPE IN AN ELECTRONIC TRADING SYSTEM

(75) Inventors: Howard W. Lutnick, New York, NY (US); Kevin M. Foley, New York, NY (US); Joseph Noviello, Summit, NJ (US); Michael Sweeting, Aldershot (GB)

(73) Assignee: BGC Partners, Inc., New York, NY (US)

( * ) Notice: Subject to any disclaimer, the term of this patent is extended or adjusted under 35 U.S.C. 154(b) by 956 days.

(21) Appl. No.: 11/407,012

(22) Filed: Apr. 18, 2006

(65) Prior Publication Data
US 2006/0282365 A1    Dec. 14, 2006

Related U.S. Application Data

(60) Provisional application No. 60/672,372, filed on Apr. 18, 2005.

(51) Int. Cl.
*G06Q 40/10* (2006.01)
(52) U.S. Cl. .................................................... 705/35
(58) Field of Classification Search ................ 705/35
See application file for complete search history.

(56) References Cited

U.S. PATENT DOCUMENTS

| 6,519,574 B1 * | 2/2003 | Wilton et al. ............... 705/35 |
| 2002/0046157 A1 | 4/2002 | Solomon |
| 2004/0024689 A1 * | 2/2004 | Zhou et al. .................. 705/37 |
| 2004/0059666 A1 * | 3/2004 | Waelbroeck et al. ........ 705/37 |

FOREIGN PATENT DOCUMENTS

| EP | 1041502 | 10/2000 |
| GB | 2389676 | 12/2003 |
| WO | WO 0122263 | 3/2001 |
| WO | WO 0126009 | 4/2001 |

OTHER PUBLICATIONS

Mark J. Ready, The Specialists Discretion: Stopped Orders and Price Improvement. The Review of Financial Studies, vol. 12, No. 5, (Winter 1999) pp. 1075-1112.*

* cited by examiner

*Primary Examiner*—James P Trammell
*Assistant Examiner*—Abdul Basit
(74) *Attorney, Agent, or Firm*—Thomas D. Bradshaw

(57) ABSTRACT

Systems and methods of trading items on an electronic trading system according to the invention are provided. The embodiments of the invention are based at least in part on a new order type. The new order type is an only at best order type, whereby trades are preferably only executed at the best price the item is being bought or sold.

23 Claims, 2 Drawing Sheets

SYSTEMS AND METHODS FOR PROVIDING AN ONLY AT BEST ORDER TYPE IN AN ELECTRONIC TRADING SYSTEM

CROSS-REFERENCES TO RELATED APPLICATION

This application claims the benefit of U.S. provisional application No. 60/672,372, filed Apr. 18, 2005, which is hereby incorporated by reference herein in its entirety.

BACKGROUND OF THE INVENTION

This invention relates to electronic trading systems. More specifically, this invention relates to order types that are used in electronic trading systems.

In electronic trading systems that trade based on bids and offers, many traders have requested protection from mistakenly trading through the stack (TTS)—i.e., accidentally hitting or lifting a number of current bids or offers at different prices instead of only acting on the bid or offer at the best price (the highest bid price or the lowest offer price). When these traders buy or sell items, they typically only want to execute trades at the current best price.

Courtesy of the increasing usage of "black box" algorithmic and statistical model trading computers connected to electronic trading systems, coupled with the increased speed of communications in modern broadband network environments, the price a human trader is willing to trade at may have changed by the time he or she reacts—e.g., by entering a trade command—to what he or she sees. Modern trading systems give rise to the situation of a "race condition" whereby the price a trade may be concluded at is, according to Price & Time priority matching algorithms, the first order to arrive at the trading host computer. However, the trader may also be remotely domiciled—e.g., at home in the Country or mobile—and connected at a slower network speed. As a result, the price the trader is witnessing may not be the actual price in the central trading host computer at that time. If the trader enters a trade command at a worse price than has just been updated, the trader runs the risk of missing the better updated price while other traders are ahead in the market, thereby causing the trader to trade through to the worse price.

For example, suppose that, in the market for an item such as a U.S. Treasury five-year bond, there is a bid for 100.10 and an offer for 100.11. In such a market, one participant may enter a buy order at 100.11, in an effort to lift the outstanding offer of 100.11. At substantially the same time, another participant may have entered a sell order at 100.10 in order to hit the outstanding bid of 100.10. Nevertheless, if the new selling participant was aware of the new buyer at the higher price, he would have not sold the bond at the lower price. Rather, he would have preferred to sell at the higher price or at least be placed in a queue to sell at the higher price.

A trading participant would typically want to participate at the best available market price as opposed to at a price that was worse than the best available market price. Additionally, upon seeing a better available market price, the trader's perception of the marketplace is updated and he or she is less likely to want to trade at the worse price.

Therefore, it would be desirable to provide participants with an order type that restricts the trading to only the best market price available.

It would also be desirable to provide participants with an order type that circumvents the race condition caused technically by electronic communication being quicker than human reaction.

It would also be desirable to provide a preferably configurable electronic trading system setting that restricts some or all of a participant's trading to only the best market price available.

SUMMARY OF THE INVENTION

It is an object of the invention to provide participants with an order type that restricts the trading to only the best market price available.

It is another object of the invention to provide participants with an order type that circumvents the race condition caused technically by electronic communication being quicker than human reaction.

It is yet another object of the invention to provide a preferably configurable electronic trading system setting that restricts some or all of a participant's trading to only the best market price available.

These and other objects are accomplished in accordance with the principles of the invention by providing systems and methods of trading items on an electronic trading system. The embodiments of the invention are based at least in part on a new order type. A method according to the invention includes receiving an only at best (or only-at-best) bid (offer) and determining whether the only at best bid (offer) specifies a bid (offer) price that is higher (lower) than the price of an offer (bid) in the electronic trading system. When the only at best bid (offer) specifies a price that is higher than the offer (bid) price in the system, a determination is made as to whether the offer (bid) is available to lift (hit). When the offer (bid) is available to lift (hit), a trade matching the only at best bid (offer) and the offer (bid) is executed. When the offer (bid) is not available to trade, the only at best bid (offer) is queued at the price of the offer (bid). The participant may be alerted that the bid (offer) specified a price that was higher (lower) than the offer (bid) price and given the opportunity to maintain the only at best order or modify it.

In some embodiments of the invention, a pre-determined setting may deactivate the only at best bid (offer) when an offer (bid) is in the trading system at a predetermined price increment lower (higher) than the only at best bid (offer).

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Many participants that trade on electronic trading systems seek protection from mistakenly trading through the stack whereby trades are executed at suboptimal prices. Such trading may be a direct result of technical difficulties presented by connecting to trading systems at slower speeds. One system according to the invention enables a default participant setting that preferably allows the participant to designate his or her orders as "Only at Best"—i.e., to trade only at the best price the item is being bought or sold. Orders that are entered at the market price may be either executed at that market price or moved to another price at which the market is already trading when that other price represents the best price for the participant.

In some embodiments of the invention, the Only at Best setting should only preferably apply if the participant is going to trade through to a worse price than the best price. It should preferably not intervene if the market moves away and the participant misses the price—e.g., misses the buy at first price, in which case the price then moves higher and the participant may or may not join the queue of buyers.

In a specific situation according to the invention where the market is at 100.10 bid and 100.11 offered, one participant enters a Sell order at 100.10 and one enters a Buy order at 100.11. If the Sell order reaches the market first and volume starts to trade at the 100.10 price—i.e., at least two participants are engaged in an active trading session at a price of 100.10—the participant trying to buy at 100.11 is preferably placed in a queue of buyers at 100.10. (If the system places the participant's order at 100.11, he or she will actually be trading through the stack at the suboptimal price, which is not desired in this particular setting.)

A more aggressive participant who prefers the 100.11 price when choosing that particular price should preferably not enable the only at Best option and should therefore choose the setting that does not implement the only at best functionality described above. In this situation, the participant's workstation, which may be configured by the participant, configured as part of the system, or set by a system operator or controller, should not be enabled to implement only at best trading.

In alternative embodiments of the invention, the system preferably alerts a participant if the market price has recently changed immediately prior to his submitting an order. With respect to the above-described example, such a "fast alert" system would alert the participant that the item is in fact cheaper to purchase (or more profitable to sell). The system may, in such embodiments, prevent the transaction from occurring until the participant acknowledges the alert. Thus, such a "fast alert" feature may be used in conjunction with the only at best functionality described above.

Figure 1:
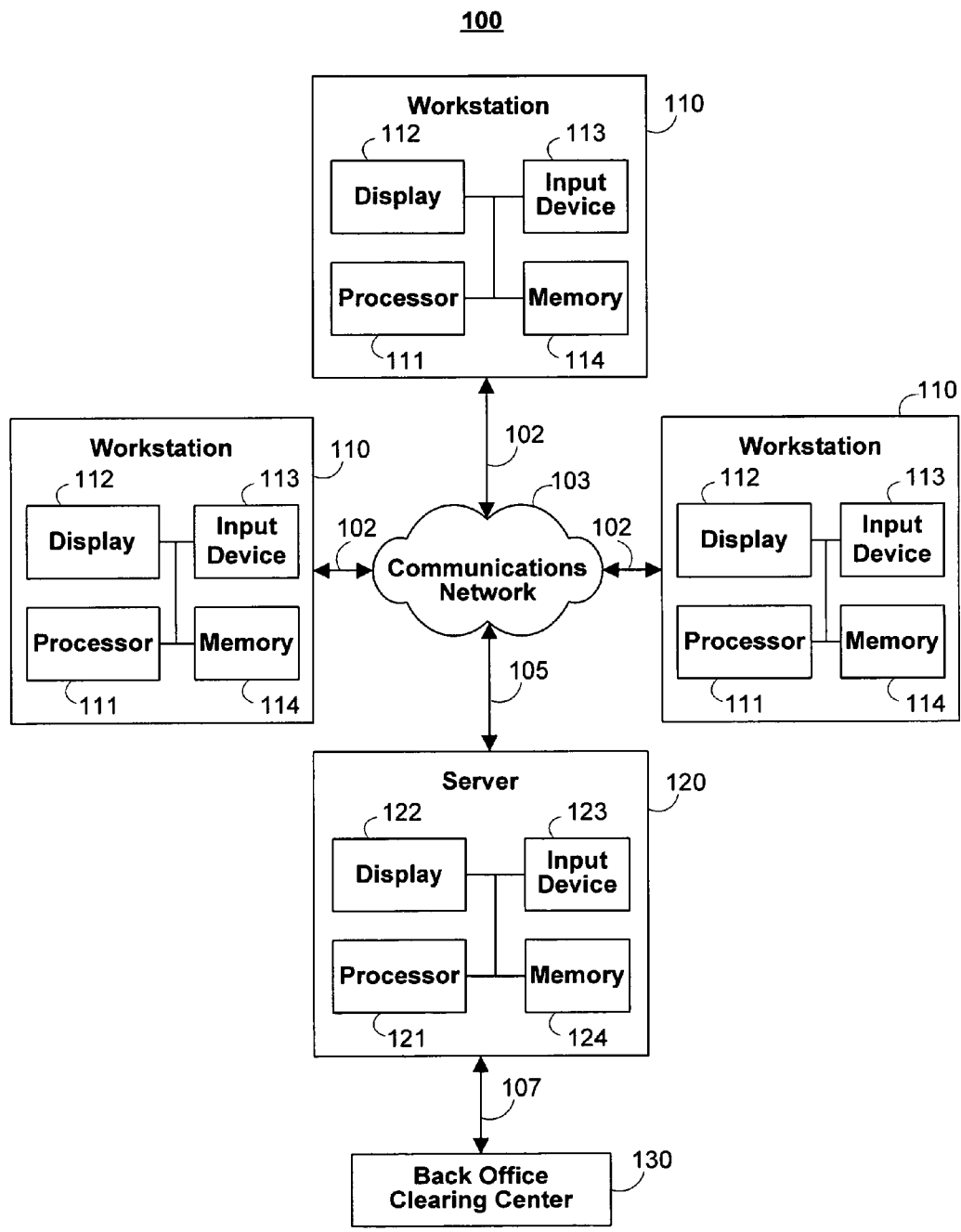
FIG. 1 is a block diagram of an exemplary system that may be used to implement the processes and functions of certain embodiments of the present invention.

Referring to FIG. 1, exemplary system 100 for implementing the invention is shown. As illustrated, system 100 may include one or more workstations 110. Workstations 110 may be local or remote, and are connected by one or more communications links 102 to communications network 103 that is linked via communications link 105 to server 120. Server 120 may be linked to back office clearing center 130 via communications link 107.

Server 120 may be any suitable server, processor, computer, data processing device, or combination of the same. Server 120 may be used to implement the governing logic that processes and executes orders and trades, and distributes trade and market information, including price and size information, to workstations 110. Communications network 103 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 102 and 105 may be any communications links suitable for communicating data between workstations 110 and server 120, such as network links, dial-up links, wireless links, hard-wired links, etc.

Workstations 110 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 110 may be used by participants to enter bid, offer, buy and sell orders, such as only at best bids and offers, for the items being traded and view market activity corresponding to these items.

A typical workstation 110 may include processor 111, display 112, input device 113, and memory 114, which may be interconnected. In a preferred embodiment, memory 114 includes a storage device for storing a workstation program for controlling processor 111. Memory 114 may also store participant configuration files, as described below, and other data on the storage device. The workstation program may include a trading application for running a trading interface that may be displayed on display 112. Display 112 may display to the user a participant-selectable dialogue box that presents a selection to maintain the only at best order and a selection to modify the only at best order.

Input device 113 may be used in conjunction with display 112 by participants to enter only at best bids/offers and to execute and monitor trades. Processor 111 may use the workstation program to receive trade information relating to the items being traded by multiple participants of system 100, or other participants, and display such information on display 112 or communicate such information to display 112. Moreover, processor 111 may alert the participant that submitted an only at best order that the bid or offer specified a price that was higher in case of a bid (lower in case of an offer) than the offer or bid price.

Server 120 may include processor 121, display 122, input device 123, and memory 124, which may be interconnected. In preferred embodiments, memory 124 includes a storage device for storing a server program that provides the governing logic for controlling processor 121. Processor 121 may use the server program to process orders and execute trades communicated from various workstations that are operated by multiple participants of system 100, or other participants, and communicate trade information, as well as bid and offer information, to workstations 110 and back office clearing center 130.

More specifically, processor 121 may use the server program to process orders placed by participants in response to participants entering commands using input device(s) 113, and execute trades based on such orders, whenever applicable. For example, processor 121 may determine whether a received only at best offer (bid) specifies a price that is lower (higher) than that of a bid (offer) and whether the bid (offer) is available to hit. Moreover, processor 121 may execute a trade matching the only at best offer (bid) and the bid (offer) when the bid is available to hit. Otherwise, processor 121 may queue the only at best offer (bid) to trade at the price of the bid (offer).

Back office clearing center 130 may be any suitable equipment, such as a computer, a laptop computer, a mainframe computer, etc., or any combination of the same, for causing trades to be settled and/or verifying that trades are settled. Communications link 107 may be any communications links suitable for communicating data between server 120 and back office clearing center 130, such as network links, dial-up links, wireless links, hard-wired links, etc.

Figure 2:
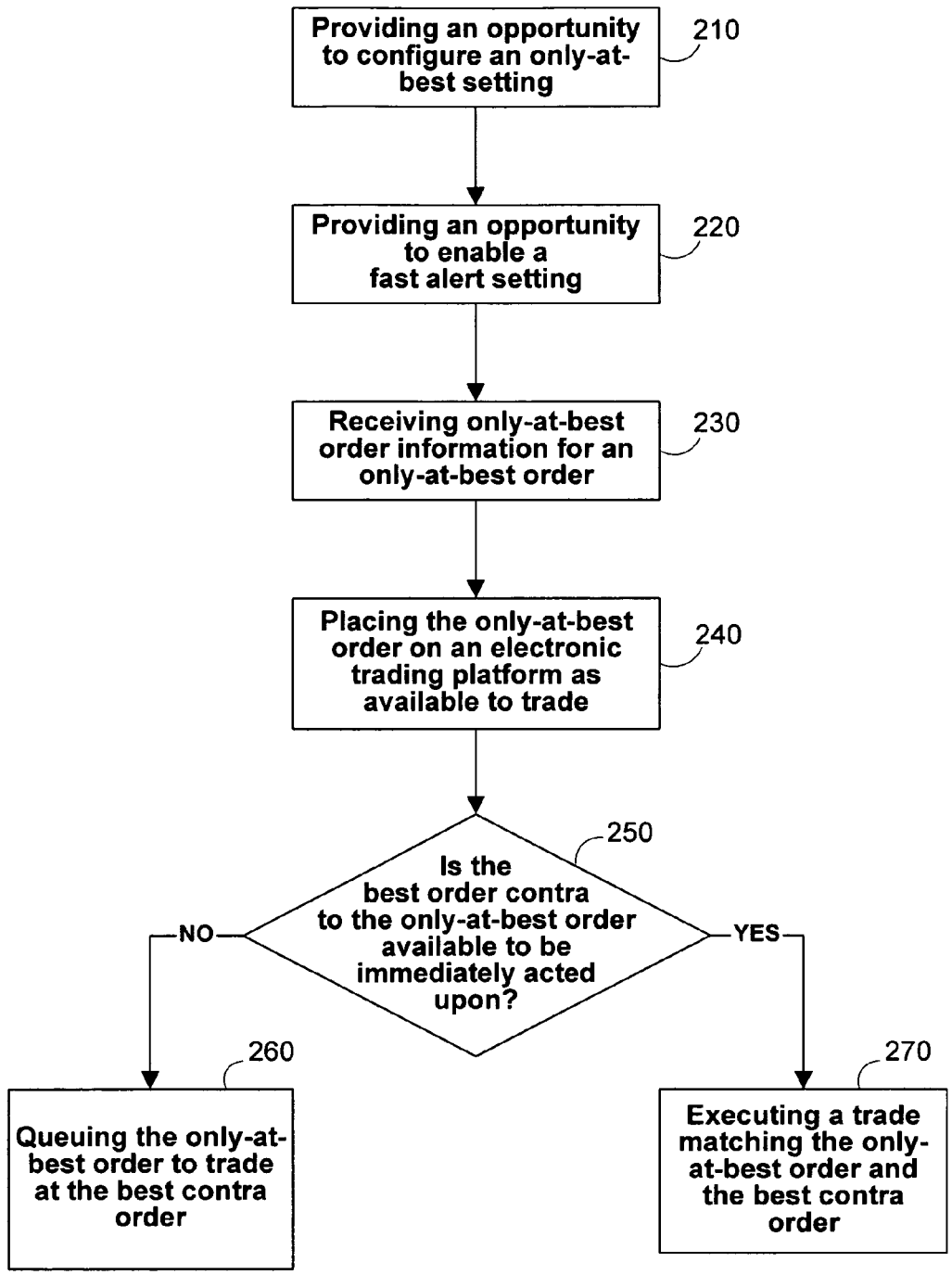
FIG. 2 is a flow diagram that shows one method according to the present invention.

FIG. 2 is a flow chart 200 that describes a method that can be used in certain embodiments of the invention. Step 210 shows providing a participant with an opportunity to configure an only at best setting. Step 220 shows providing a participant with an opportunity to enable a fast alert setting. Step 230 shows receiving only at best order information for an only at best order. Step 240 shows placing the only at best order on an electronic trading platform available to trade. It should be noted that an only at best order preferably specifies at least the following pieces of information: 1) a willingness to immediately trade at a particular price, and 2) an indication as to whether the willingness is to buy or to sell the item. While the only at best order specifies a willingness to trade at a particular price, the only at best order is preferably only to be traded if it can be traded with the best contra order available as described below.

If the best order contra to the only at best order is not available to be immediately acted upon, as queried in step 250, then the only at best order is placed in a queue to trade at the best contra order when it becomes available at step 260. If the best order contra to the only at best order is available to be immediately acted upon, then a trade is executed matching the only at best order and the best contra order at step 270.

The participant is preferably alerted when circumstances exist that may activate only at best functionality. Such circumstances may be, for example, that a better price is available for the item as compared to the price specified or implicated by the only at best order. Preferably, the complete facts of the only at best situation may be included in the alert sent to the participant. Furthermore, the alert may include a participant-selectable option to consummate the order independent of whether a better contra order exists on the market.

The alert may preferably be a screen pop-up that states, "There is a better price for your order than the one you entered."

It has been shown that systems and methods for providing an only at best order type according to the invention are provided.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A method of trading items on an electronic trading system, the method comprising:
    receiving in the electronic trading system an only-at-best bid to purchase an instrument, the only-at-best bid being received from a bidder, the only-at-best bid comprising a bid price, in which:
        the electronic trading system comprises a server configured to receive a plurality of bids and offers from a plurality of trading participants,
        the plurality of trading participants comprising the bidder and at least two trading participants different from the bidder, and
        the plurality of bids and offers being entered into a plurality of user workstations in electronic communication with the server;
    determining by the electronic trading system that the bid price is higher than a lowest offer price of a lowest offer to sell the instrument in the electronic trading system, the lowest offer being contra to the only-at-best bid;
    determining by the electronic trading system that, at a time when the only-at-best bid is received by the server, at least two other trading participants are engaged in an active trading session for the instrument at the lowest offer price, the lowest offer price being lower than the bid price; and
    responsive to the act of determining that the bid price is higher than the lowest offer price of the lowest offer in the electronic trading system and the act of determining that, at a time when the only-at-best bid is received by the server, the at least two trading participants are engaged in an active trading session for the instrument at the lowest offer price, queuing by the electronic trading system the only-at-best bid to trade at the lowest offer price of the lowest offer.

2. The method of claim 1 further comprising alerting by the electronic trading system the bidder that the lowest offer price is lower than the bid price.

3. The method of claim 1 further comprising displaying a participant-selectable dialogue box that presents a selection to maintain the only-at-best bid and a selection to modify the only-at-best bid.

4. The method of claim 1 further comprising receiving by the electronic trading system an instruction to enable an only-at-best setting.

5. The method of claim 1 further comprising receiving by the electronic trading system an instruction to enable an only-at-best setting for the only-at-best bid.

6. The method of claim 5 further comprising providing by the electronic trading system a system setting that implements an only-at-best requirement on a selected group of orders.

7. A method of trading items on an electronic trading system, the method comprising:
    receiving in the electronic trading system an only-at-best offer by an offeror to sell an instrument, the only-at-best offer being received from an offeror, the only-at-best offer comprising an offer price, in which:
        the electronic trading system comprises a server configured to receive a plurality of bids and offers from a plurality of trading participants,
        the plurality of trading participants comprising the offeror and at least two trading participants different from the offeror, and
        the plurality of bids and offers being entered into a plurality of user workstations in electronic communication with the server;
    determining that the offer price is lower than a highest bid price of a highest bid to purchase the instrument in the electronic trading system, the highest bid being contra to the only-at-best offer;
    determining that, at a time when the only-at-best offer is received by the server, at least two trading participants are engaged in an active trading session for the instrument at the highest bid price, the highest bid price being higher than the offer price; and
    responsive to determining that the offer price is lower than the highest bid price of the highest bid in the electronic trading system and the act of determining that, at a time when the only-at-best offer is received by the server, the at least two trading participants are engaged in an active trading session for the instrument at the highest bid price, queuing the only-at-best offer to trade at the highest bid price of the highest bid.

8. The method of claim 7 further comprising alerting by the electronic trading system the offeror that the highest bid price is higher than the offer price.

9. The method of claim 7 further comprising displaying a participant-selectable dialogue box that presents a selection to maintain the only-at-best offer and a selection to modify the only-at-best offer.

10. The method of claim 7 further comprising receiving by the electronic trading system an instruction to enable an only-at-best setting.

11. The method of claim 7 further comprising receiving by the electronic trading system an instruction to enable an only-at-best setting for the only-at-best offer.

12. The method of claim 11 further comprising providing by the electronic trading system a system setting that implements an only-at-best requirement on a selected group of orders.

13. An electronic trading system comprising:
a workstation for receiving from a bidder an only-at-best bid to purchase an instrument, the only-at-best bid comprising a bid price; and
a server in electronic communication with the workstation and a plurality of other workstations, the server operable to:
receive a plurality of bids and offers from a plurality of trading participants, the plurality of trading participants comprising the bidder and at least two trading participants different from the bidder;
determine that the bid price is higher than a lowest offer price of a lowest offer to sell the instrument in the electronic trading system, the lowest offer being contra to the only-at-best bid;
determine that, at a time when the only-at-best bid is received, at least two trading participants are engaged in an active trading session for the instrument at the lowest offer price, the lowest offer price being lower than the bid price; and
responsive to the act of determining that the bid price is higher than the lowest offer price of the lowest offer in the electronic trading system and the act of determining that the at least two trading participants are engaged in an active trading session for the instrument at the lowest offer price, queue the only-at-best bid to trade at the lowest offer price of the lowest offer.

14. The system of claim 13 wherein the workstation is operable to alert the bidder that the lowest offer price is lower than the bid price.

15. The system of claim 13 wherein the workstation is operable to display a participant-selectable dialogue box that presents a selection to maintain the only-at-best bid and a selection to modify the only-at-best bid.

16. An electronic trading system comprising:
a workstation for receiving an only-at-best offer to sell an instrument, the only-at-best offer comprising an offer price; and
a server in electronic communication with the workstation and a plurality of other workstations, the server operable to:
receive a plurality of bids and offers from a plurality of trading participants, the plurality of trading participants comprising the offeror and at least two trading participants different from the offeror;
determine that the offer price is lower than a highest bid price of a highest bid to purchase the instrument in the electronic trading system, the highest bid being contra to the only-at-best offer;
determine that, a time when the only-at-best offer is received, at least two trading participants are engaged in an active trading session for the instrument at the highest bid price, the highest bid price being higher than the offer price;
responsive to the act of determining that the at least two trading participants are engaged in an active trading session for the instrument at the highest bid price, queue the only-at-best offer to trade at the highest bid price of the highest bid.

17. The system of claim 16 wherein the workstation is operable to alert the offeror that the highest bid price is higher than the offer price.

18. The method of claim 16 wherein the workstation is operable to display a participant-selectable dialogue box that presents a selection to maintain the only-at-best offer and a selection to modify the only-at-best offer.

19. The method of claim 1, in which the only-at-best bid comprises a request to:
if (a) the bid price is higher than (b) a best offer price of a best offer to sell the instrument that is in the electronic trading system at a time when the only-at-best bid is received by the server, then either:
(i) execute a trade with the best offer at the best offer price, or
(ii) queue the bid at the best offer price.

20. The method of claim 19, in which the only-at-best bid further comprises a request to:
if (a) the bid price is equal to or less than (b) a best offer price of a best offer to sell the instrument that is in the electronic trading system at a time when the only-at-best bid is received by the server, then treat the only-at-best bid as a regular bid.

21. The electronic trading system of claim 16, in which the only-at-best bid comprises a request to:
if (a) the offer price is lower than (b) a best bid price of a best bid to purchase the instrument that is in the electronic trading system at a time when the only-at-best offer is received by the server, then either:
(i) execute a trade with the best bid at the best bid price, or
(ii) queue the offer at the best bid price.

22. A method of trading items on an electronic trading system, the method comprising:
receiving in the electronic trading system an only-at-best order for an instrument offered for trade by a first trading participant, the only-at-best order comprising one of (i) an only-at-best bid to purchase the instrument and (ii) an only-at-best offer to sell the instrument, the only-at-best order comprising an only-at-best price, the only-at-best order further comprising a request to:
if (a) the only-at-best price is worse than (b) a best contra price that is in the electronic trading system at a time when the only-at-best order is received by the server, then perform one of:
(i) execute a trade at the best contra price, or
(ii) queue the only-at-best order at the best contra price,
the electronic trading system comprising a server configured to receive a plurality of bids and offers from a plurality of trading participants, the plurality of trading participants comprising the first trading participant and at least two trading participants different from the first trading participant, the plurality of bids and offers being entered into a plurality of user workstations in electronic communication with the server;
determining by the electronic trading system that the only-at-best price is worse than the best price of the best contra order in the electronic trading system, the best contra order being contra to the only-at-best order;
determining by the electronic trading system that, at a time when the only-at-best order is received by the server, at least two other trading participants are engaged in an active trading session for the instrument at the best price of the best contra order, the best price of the best contra order being better than the only-at-best price; and responsive to the act of determining that, at a time when the only-at-best order is received by the server, the at least two trading participants are engaged in an active trading session for the instrument at the best price of the best contra order, queuing by the electronic trading system the only-at-best order to trade at the best price of the best contra order.

23. An electronic trading system comprising:

a workstation for receiving from a first trading participant an only-at-best order for an instrument offered for trade by the first trading participant, the only-at-best order comprising one of an only-at-best bid to purchase the instrument and an only-at-best offer to sell the instrument, the only-at-best order comprising an only-at-best price, the only-at-best order further comprising a request to:

if (a) the only-at-best price is worse than (b) a best contra price that is in the electronic trading system at a time when the only-at-best order is received by the server, then perform one of:

(i) execute a trade at the best contra price, or (ii) queue the only-at-best order at the best contra price, and a server in electronic communication with the workstation and a plurality of other workstations, the server operable to:

receive a plurality of bids and offers from a plurality of trading participants, the plurality of trading participants comprising the first trading participant and at least two trading participants different from the first trading participant;

determine that the only-at-best price is worse than a best price of a best contra order in the electronic trading system, the best contra order being contra to the only-at-best order;

determine that, at a time when the only-at-best order is received, at least two trading participants are engaged in an active trading session for the instrument at the best price of the best contra order, the best price of the best contra order being better than the only-at-best price;

responsive to the act of determining that, at a time when the only-at-best order is received, at least two trading participants are engaged in an active trading session for the instrument at the best price of the best contra order, queue the only-at-best order to trade at the best price of the best contra order.

* * * * *